United States Patent [19]
Akashi

[11] Patent Number: 5,293,194
[45] Date of Patent: Mar. 8, 1994

[54] FOCUS DETECTION APPARATUS HAVING AN AUXILIARY LIGHT

[75] Inventor: Akira Akashi, Yokohama, Japan

[73] Assignee: Canon Kabushiki Kaisha, Tokyo, Japan

[21] Appl. No.: 9,394

[22] Filed: Jan. 27, 1993

Related U.S. Application Data

[63] Continuation of Ser. No. 645,474, Jan. 24, 1991, abandoned.

[30] Foreign Application Priority Data

Jan. 25, 1990 [JP] Japan .................. 2-016802
Jan. 25, 1990 [JP] Japan .................. 2-016803

[51] Int. Cl.⁵ .............................................. G03B 13/00
[52] U.S. Cl. ............................... 354/402; 354/403
[58] Field of Search ........................... 354/400–409

[56] References Cited

U.S. PATENT DOCUMENTS

| | | | |
|---|---|---|---|
| 4,071,626 | 10/1987 | Ishizaki et al. | 358/213.19 |
| 4,746,947 | 5/1988 | Nakai | 354/402 |
| 4,768,052 | 8/1988 | Hamada et al. | 354/402 |
| 4,774,401 | 9/1988 | Yamada et al. | 354/432 |
| 4,801,962 | 1/1989 | Akashi | 354/402 |
| 4,851,657 | 7/1989 | Taniguchi et al. | 354/408 |
| 4,974,007 | 11/1990 | Yoshida | 354/402 |
| 4,980,716 | 12/1990 | Suzuki et al. | 354/403 |
| 4,992,817 | 2/1991 | Aoyama et al. | 354/403 |

FOREIGN PATENT DOCUMENTS

3803305  8/1988  Fed. Rep. of Germany .

Primary Examiner—David M. Gray
Attorney, Agent, or Firm—Fitzpatrick, Cella, Harper & Scinto

[57] ABSTRACT

A focus detection apparatus for a camera in which a plurality of focus sensors detect the focus states of a plurality of different areas within the scene. A processor determines whether the focus can or cannot be obtained to a specific area of the scene on the basis of the outputs of the focus sensors. An auxiliary light is emitted to assist in focusing, if the specific one of the different areas is, for example, the central area.

25 Claims, 8 Drawing Sheets

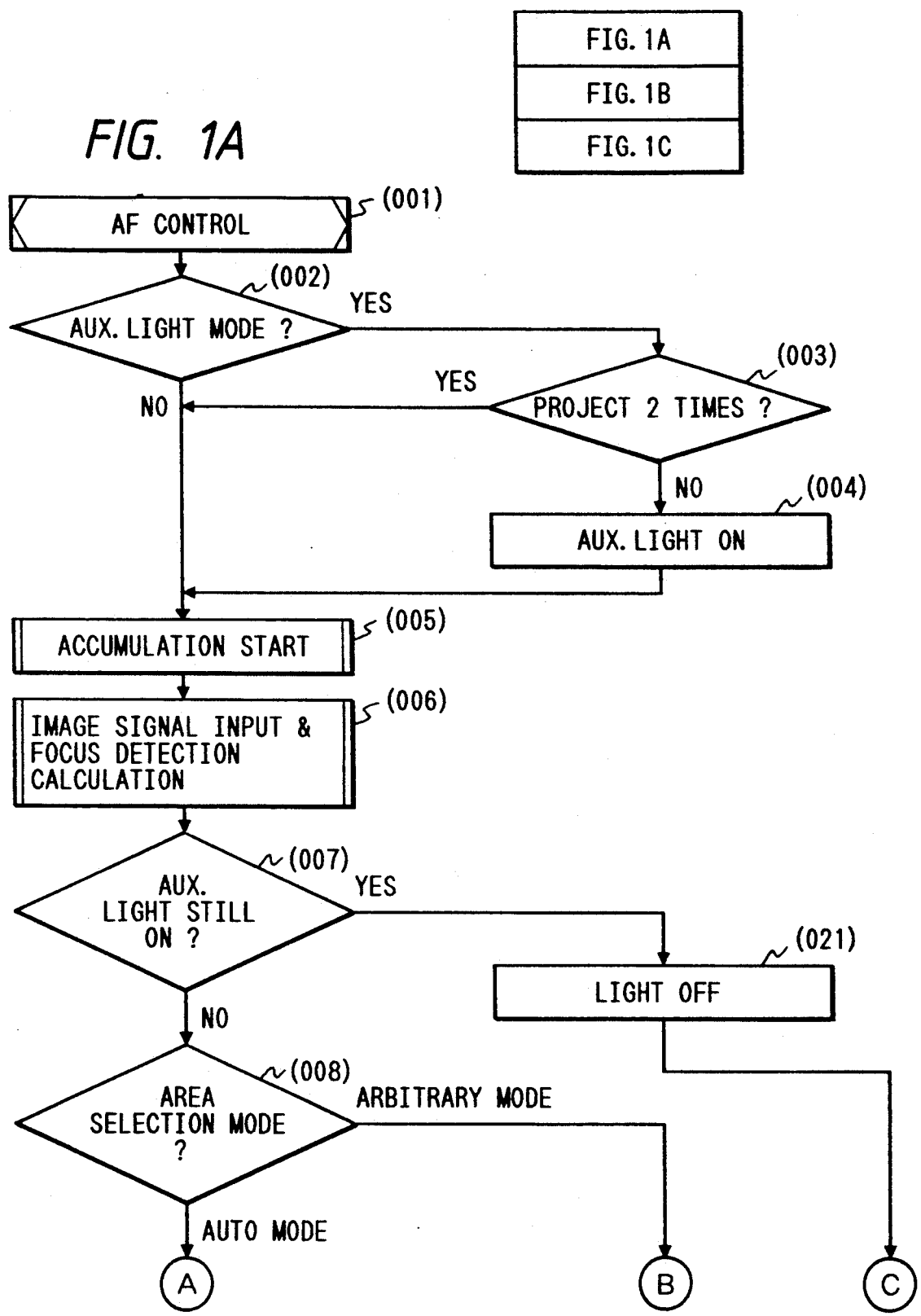

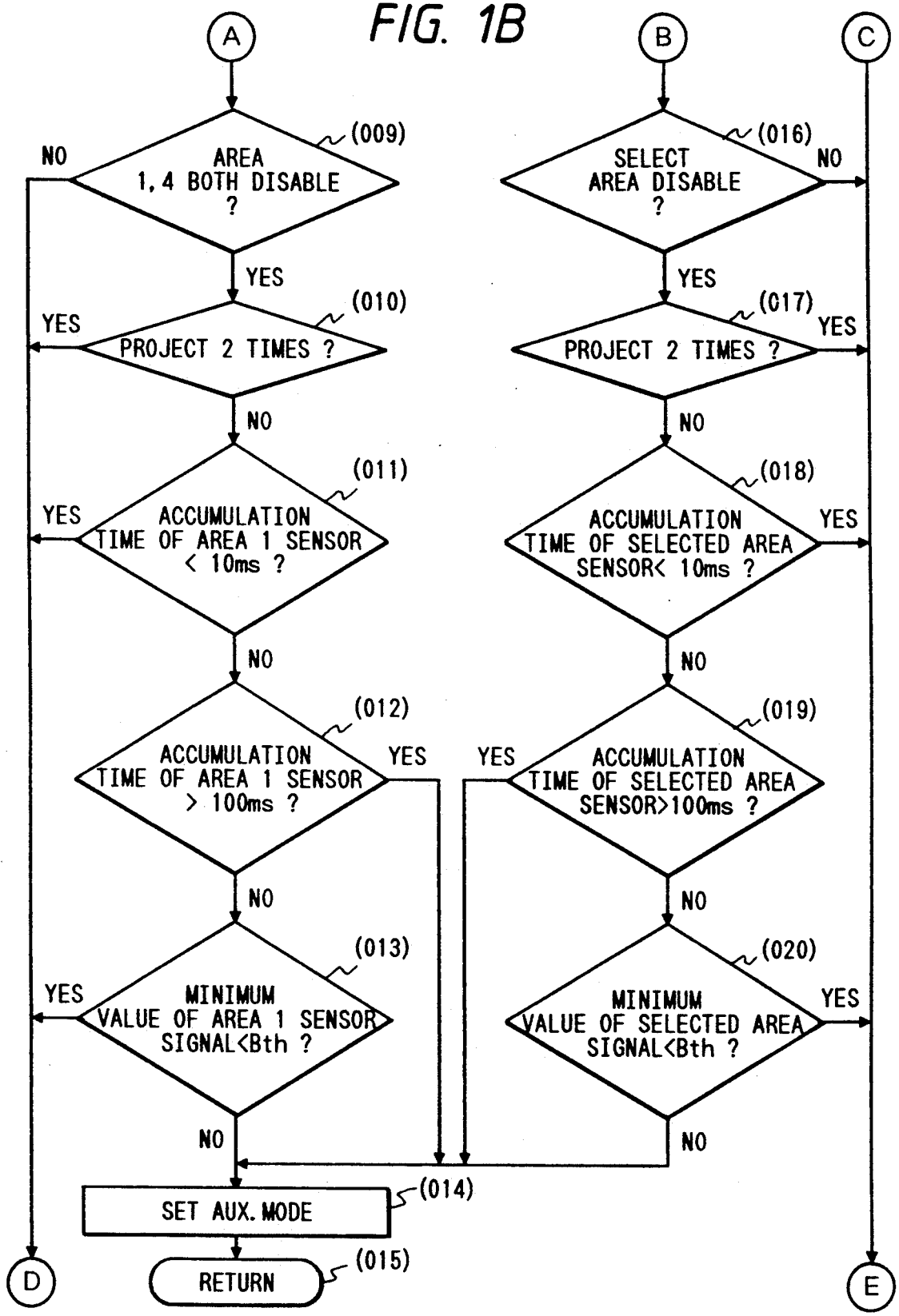

FOCUS DETECTION APPARATUS HAVING AN AUXILIARY LIGHT

This application is a continuation of application Ser. No. 07/645,474, filed Jan. 24, 1991, now abandoned.

BACKGROUND OF THE INVENTION

1. Field of the Invention

The present invention relates to a focus detection apparatus for a camera or the like, having an auxiliary light source for illuminating an object to be photographed, for performing focus detection of plural object areas within a frame of a photographic lens.

2. Related Background Art

In a conventional focus detection apparatus for a camera, the following method of detecting a defocus amount of an object is known well. Light beams emitted from an object and passing through different exit pupil areas of a photographic lens are focused on a pair of line sensors, and a relative positional displacement between a pair of image signals obtained by photoelectrically converting an object image is obtained, thereby detecting the defocus amount of the object.

In the above method, since a pair of focus detection systems (optical systems and sensors) are used, only a defocus amount in one object area within the frame is detected. However, various methods are proposed wherein a plurality of detection systems are prepared to detect defocus amounts of plural object areas within the frame.

Even if plural object areas are subjected to focus detection, the number of object areas to be finally focused in a camera is one or two (in the later case, the photographic lens is operated to an intermediate focus position which covers, e.g., two areas in terms of the depth of field), an object area is selected in accordance with a given technique, and focusing of the photographic lens is performed by the defocus amount of the selected area.

Area selection is generally performed by a method in which an object area nearest to the camera is selected.

In this conventional focus detection apparatus, a defocus amount cannot be detected when the object has a low brightness level or when there is no change in brightness (reflectance) on a surface of an object even if the object brightness level is not low. For this reason, an auxiliary illumination unit is often used to illuminate the object in a focus undetectable state.

When plural focus detection object areas are present, it is convenient to arrange the illumination unit to illuminate these plural object areas.

In the conventional arrangement, however, the following problems are posed when focus detection of the plural object areas is performed using an illumination unit.

If a condition for operating the illumination unit is given such that all object areas are focus undetectable, the illumination unit is not operated even if one object area is focus detectable. For example, in a bright background with a person as an object within a frame, like a night scene, the illumination unit is not operated even if the object area in which the person is located is focus undetectable. In this case, the background is focused, resulting in inconvenience.

If a condition for operating the illumination unit is given such that at least one object area in a focus undetectable state is present, an object area located in the background is unnecessarily illuminated in a focus undetectable state, thus resulting in wasteful illumination.

In addition, if the illumination unit generates a common illumination pattern to all the object areas in favor of simplicity, it is difficult for some focus detection systems to detect such an illumination pattern in some object areas in principle. If such an area becomes detectable with an illumination, it often includes a large error in defocus amount because this object is not suitable for focus detection. When the defocus amount of this area is selected as a final defocus amount, a focusing error occurs.

In a conventional apparatus, since a focus undetectable state (low contrast) and a low brightness level are conditions for projecting auxiliary light, for example, even if a focus undetectable state occurs by an excessively large relative displacement of an image by a large defocus amount, auxiliary light is projected at a relatively low object brightness level. However, a focus detectable state cannot be obtained even if a focus undetectable state is caused by an excessively large defocus amount. A wasteful response time caused by an accumulation time in the presence of auxiliary light and wasteful energy consumption caused by an illumination occur.

SUMMARY OF THE INVENTION

According to one aspect of the present invention, there is provided a focus detection apparatus for respectively detecting focus states of different areas of a frame, wherein auxiliary illumination light (to be referred to as auxiliary light hereinafter) is projected when a specific area (e.g., a central area of the frame) of the frame is focus undetectable and even if other areas are focus detectable. With this arrangement, if an object to be photographed is a person, there is a high probability for photographing the person to be located in the specific area (e.g., the central area) of the frame. Under this photographic situation, with the arrangement of the present invention, when the object is focus undetectable, the auxiliary light can be projected, and this object can be rendered focus detectable.

According to another aspect of the present invention, there is provided a focus detection apparatus for performing focus detection for different areas of a frame, wherein a focus detection result from a detector area which is not suitable in principle for detection of light reflected by the object in accordance with pattern projection is not selected when the pattern projection with auxiliary light is performed on the object.

According to still another aspect of the present invention, there is provided a focus detection apparatus wherein auxiliary light is projected when a minimum value of image signals stored in a plurality of pixels constituting a sensor array is larger than a predetermined level as an auxiliary light projection condition, and the auxiliary light is not projected when a large defocus amount is detected.

The above and other objects, features, and advantages of the present invention will be apparent from the detailed description of the preferred embodiment in conjunction with the accompanying drawings.

DETAILED DESCRIPTION OF THE PREFERRED EMBODIMENT

The invention will be described in detail with reference to an illustrated embodiment.

Figure 3:
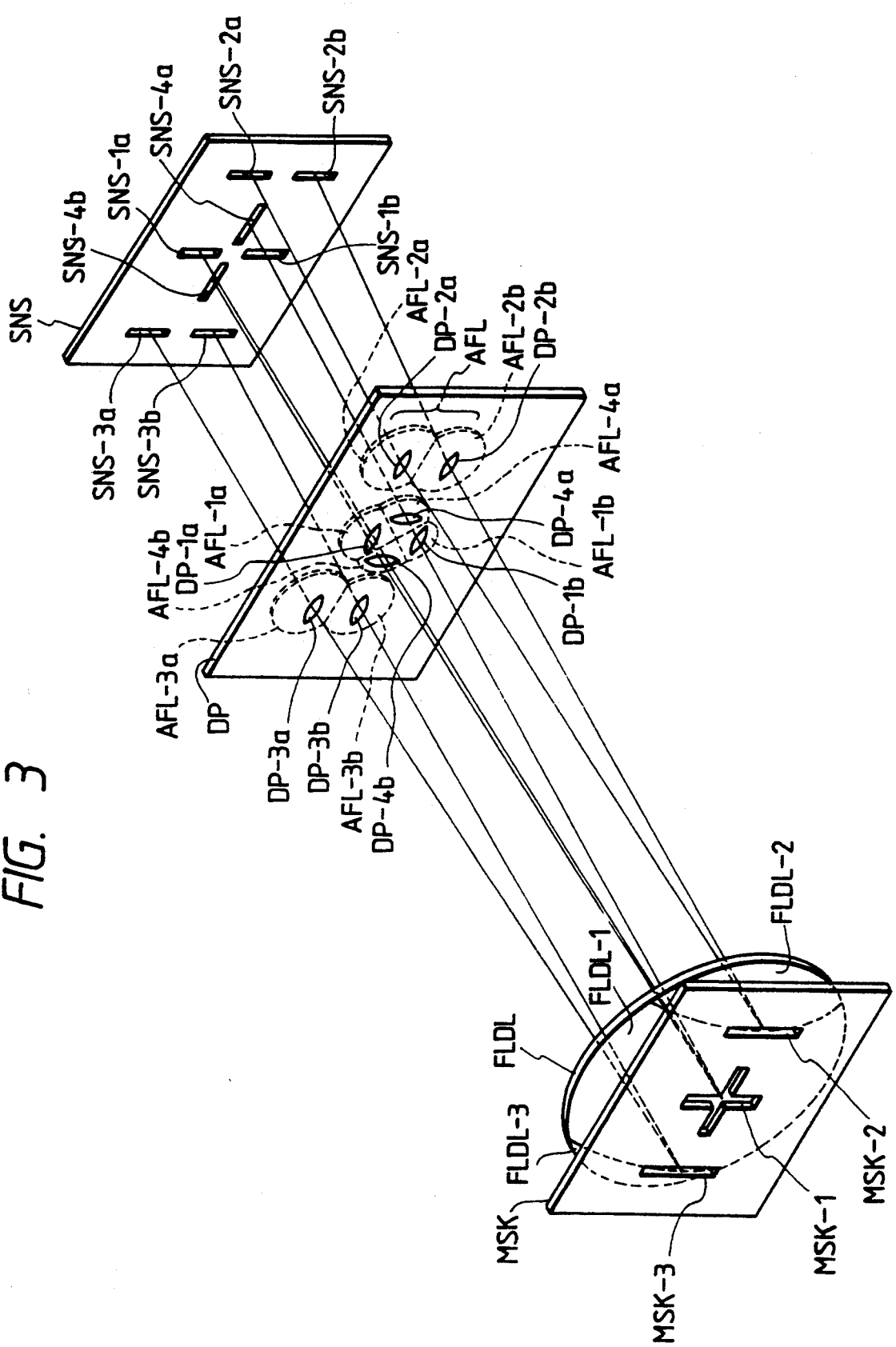
FIG. 3 is a detailed exploded perspective view of a focus detection system of this apparatus.

FIG. 3 is a view schematically showing a focus detection apparatus according to the embodiment of the present invention.

A field view mask MSK has a cross-shaped central opening MSK-1 and vertically elongated end openings MSK-2 and MSK-3. A field lens FLDL comprises three portions FLDL-1, FLDL-2, and FLDL-3 respectively corresponding to three openings MSK-1, MSK-2, and MSK-3 of the field view mask MSK. A diaphragm DP comprises of: four central openings, i.e., pairs of openings DP-1$a$ and DP-1$b$ and openings DP-4$a$ and DP-4$b$; a pair of right openings DP-2$a$ and DP-2$b$; and a pair of left openings DP-3$a$ and DP-3$b$. The areas FLDL-1, FLDL-2, and FLDL-3 of the field lens FLDL have functions of respectively focusing the opening pairs DP-1, DP-2, and DP-3 near an exit pupil of an objective lens (not shown). A secondary focusing lens AFL comprises four pairs, i.e., eight lenses AFL-1$a$, AFL-1$b$, AFL-4$a$, AFL-4$b$, AFL-2$a$, AFL-2$b$, AFL-3$a$, and AFL-3$b$. These lenses are located behind the diaphragm DP at positions respectively corresponding to the openings. A sensor SNS comprises four pairs, i.e., eight sensor arrays SNS-1$a$, SNS-1$b$, SNS-4$a$, SNS-4$b$, SNS-2$a$, SNS-2$b$, SNS-3$a$, and SNS-3$b$. The sensor arrays respectively correspond to the secondary focusing lenses AFL to receive images.

In the focus detection system shown in FIG. 3, when a focal point of the photographic lens is located in front of a film surface, object images formed on the respective sensor arrays are close to each other. However, when the focal point of the photographic lens is located behind the film surface, object images formed on the respective sensor arrays are separated from each other. Relative positional displacements of these object images have a predetermined relationship with defocus amounts of the photographic lens. When an appropriate arithmetic operation is performed for a sensor output pair from each sensor array pair, an out-of-focus amount of the photographic lens, i.e., a defocus amount, can be detected.

With the above arrangement, near the center of the photographic or observing range of an objective lens (not shown), a distance to an object whose light amount distribution is changed in one vertical or horizontal direction can be measured. A distance to an object located at a position corresponding to the peripheral opening MSK-2 or MSK-3 except for the central openings of the field view mask can also be measured.

Figure 2:
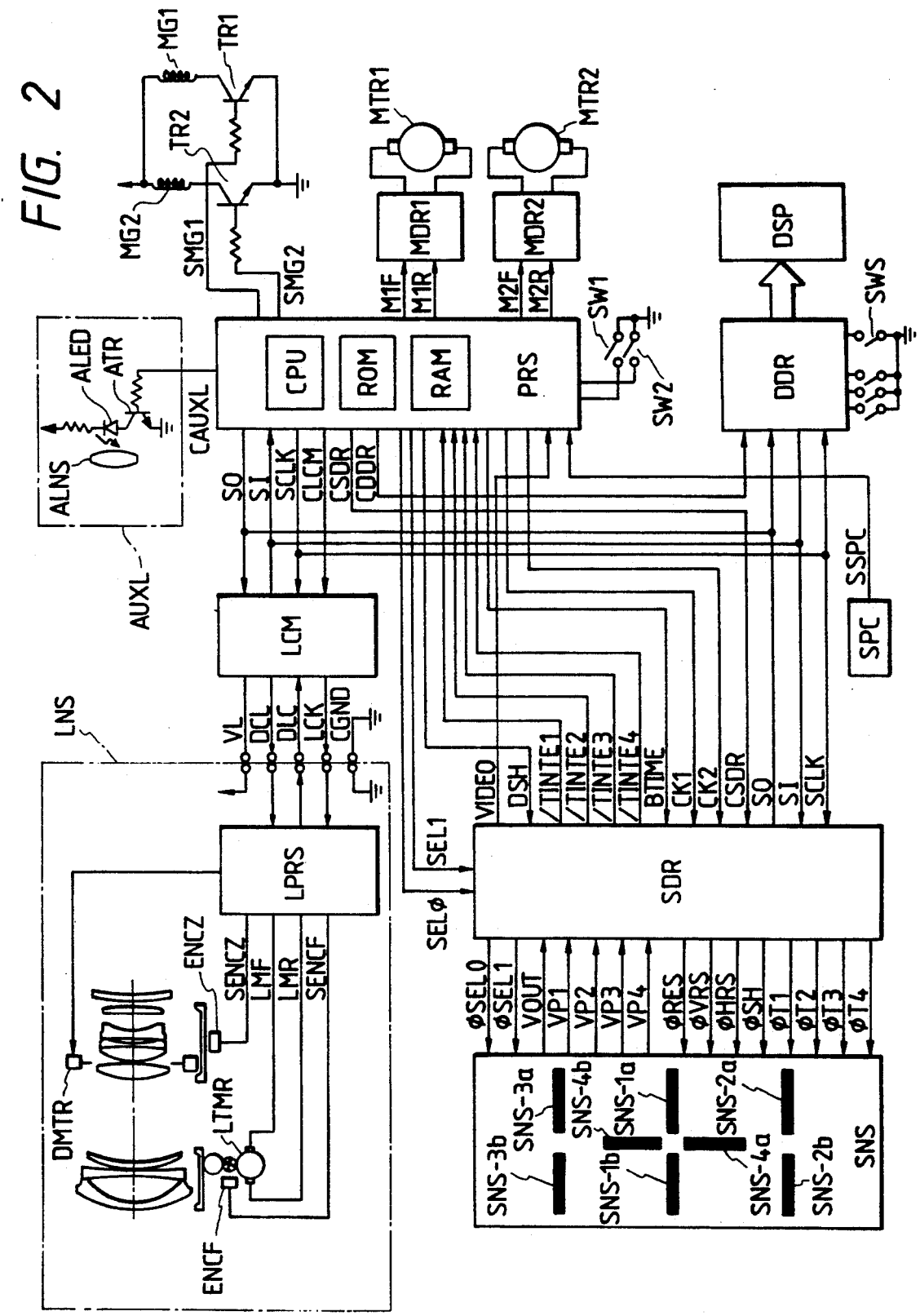
FIG. 2 is a diagram showing a detailed circuit arrangement obtained when the apparatus of this embodiment is incorporated in a camera.

FIG. 2 is a diagram showing a circuit arrangement of a camera having the focus detection apparatus shown in FIG. 3, and the respective components will be described below.

Referring to FIG. 2, a camera controller PRS comprises a one-chip microcomputer including CPU (Central Processing Unit), ROM, RAM, and A/D conversion functions. The microcomputer PRS performs a series of camera operations such as an automatic exposure control function, an automatic focus control function, and film winding/rewinding in accordance with a camera sequence program stored in the ROM. For this purpose, the microcomputer PRS communicates with peripheral circuits in the camera body and a controller in a lens to control the respective circuits and lens operations by using communication signals SO, SI, SCLK, and communication selection signals CLCM, CSDR, and CDDR.

The communication signal SO is a data signal output from the microcomputer PRS. The communication signal SI is a data signal input to the microcomputer PRS. The communication signal SCLK is a sync clock signal for the data signals SO and SI.

A lens communication buffer circuit LCM supplies power to a lens power source terminal VL during an operation of the camera and serves as a communication buffer between the camera and the lens when the selection signal CLCM from the microcomputer PRS is set at a high-potential level (to be referred to as an H level, whereas a low-potential level is referred to as an L level hereinafter).

When the microcomputer PRS sets the selection signal CLCM at H level and outputs predetermined data as the signal SO in synchronism with the sync clock SCLK, the buffer circuit LCM outputs the signals SCLK and SO as buffer signals LCK and DCL through communication contacts between the camera and the lens. At the same time, a buffer signal of the signal DLC from the lens LNS is output as the signal SI. The microcomputer PRS inputs the signal SI as the lens data in synchronism with the sync clock SCLK.

A switch detection/display circuit DDR is selected when a signal CDDR is set at H level and is controlled by the microcomputer PRS by using the signals SO, SI, and SCLK. That is, on the basis of data sent from the microcomputer PRS, a display state of a camera display member DSP is changed. The ON/OFF state of each operation member of the camera is signaled to the microcomputer PRS.

Switches SW1 and SW2 are interlocked with a release button (not shown). Upon depression of the release button to the first step, the switch SW1 is turned on. Upon depression of the release button to the second step, the switch SW2 is turned on. The microprocessor PRS performs photometric and automatic focusing operations in the ON state of the switch SW1. The microcomputer PRS then performs exposure control and the subsequent film winding operation by triggering the switch SW2.

The switch SW2 is connected to an "interrupt input terminal" of the microcomputer PRS. Even if a program is running upon ON operation of the switch SW1, the switch SW2 is turned on to generate an interrupt, so that the main routine immediately transits to a predetermined interrupt program.

A film feed motor MTR1 and a mirror up/down and shutter spring charge motor MTR2 are rotated in the forward/reverse direction by drivers MDR1 and MDR2, respectively. Signals M1F, M1R, M2F, and M2R input from the microcomputer PRS to the drivers MDR1 and MDR2 are motor control signals.

Shutter front and rear curtain start magnets MG1 and MG2 are energized by signals SMG1 and SMG2 and gain transistors TR1 and TR2, and shutter control is performed by the microcomputer PRS.

The switch detection/display circuit DDR, the motor drivers MDR1 and MDR2, and shutter control are not directly associated with the present invention, and a detailed description thereof will be omitted.

A control circuit LPRS is arranged in the lens. A signal DCL input to the control circuit LPRS in synchronism with the clock LCK is instruction data from the camera to the photographic lens LNS. A lens operation in response to this instruction data is predetermined. The control circuit LPRS analyzes the instruction in accordance with a predetermined sequence, controls focusing and the diaphragm, and outputs an operating state (e.g., a drive state of a focus control optical system and a drive state of the diaphragm) of each component of the lens and various parameters (an open f-number, a focal length, and a coefficient of a movement amount of a focus control optical system for a defocus amount) from the output DLC.

This embodiment exemplifies a zoom lens as the photographic lens. When a focus control instruction is sent from the camera, a focus control motor LTMR is driven by signals LMF and LMR to move the focus control optical system in the direction of the optical axis, thereby performing focus control, in accordance with a drive amount and a drive direction which are sent together with the focus control instruction. A moving amount of the optical system is detected by a photocoupler so that a pattern of a pulse plate rotated in synchronism with the optical system is detected. An encoder ENCF for outputting pulses corresponding to the moving amount monitors a pulse signal SENCF, and the pulses are counted by a counter in the control circuit LPRS. When the count value from the counter coincides with the moving amount sent from the control circuit LPRS, the control circuit LPRS sets the signals LMF and LMR at L level, thereby controlling the motor LMTR.

For this reason, once the focus control instruction is sent from the camera, the microcomputer PRS serving as the camera controller need not control lens driving until lens driving is completed. When a request is sent from the camera, it is possible to send the content of the counter to the camera.

When a diaphragm control instruction is sent from the camera, a known stepping motor DMTR is driven as a diaphragm drive motor in accordance with a stop-down count sent together with the diaphragm control instruction. Since the stepping motor is controlled in accordance with an open loop, it does not require any encoder.

An encoder ENCZ is attached to a zoom optical system. The control circuit LPRS receives a signal SENCZ from the encoder ENCZ and detects a zoom position. Lens parameters corresponding to the respective zoom positions are stored in the control circuit LPRS. When a request is sent from the camera microcomputer PRS, a parameter corresponding to the present zoom position is sent to the camera.

A photometric sensor SPC for exposure control receives light from an object through the photographic lens. An output SSPC from the photometric sensor SPC is input to the analog input terminal of the microcomputer PRS. After the analog signal is converted into a digital signal, the digital signal is used for automatic exposure control in accordance with a predetermined program.

A driver SDR drives a focus detection line sensor SNS. The driver SDR is selected when a signal CSDR is set at H level, and is controlled using the signals SO, SI, and SCLK by the microcomputer PRS.

Signals $\phi$SEL0 and $\phi$SEL1 sent from the driver SDR to the sensor SNS are signals SEL0 and SEL1 from the microcomputer PRS. If $\phi$SEL0="L" and $\phi$SEL1="L", then the sensor array pair SNS-1 (SNS-1a and SNS-1b) is selected. If $\phi$SEL0="H" and $\phi$SEL1="L", then the sensor array pair SNS-4 (SNS-4a and SNS-4b) is selected. If $\phi$SEL0="L" and $\phi$SEL1="H", then the sensor array pair SNS-2 (SNS-2a and SNS-2b) is selected. If $\phi$SEL0="H" and $\phi$SEL1="H", then the sensor array pair SNS-3 (SNS-3a and SNS-3b) is selected.

Upon completion of accumulation, the signals SEL0 and SEL1 are properly set to send clocks $\phi$SH and $\phi$HRS, and image signals from the sensor array pair selected by the signals SEL0 and SEL1 ($\phi$SEL0 and $\phi$SEL1) are sequentially output from an output VOUT.

Monitor signals VP1, VP2, VP3, and VP4 are output from object brightness monitor sensors located near the sensor array pairs SNS-1 (SNS-1a and SNS-1b), SNS-2 (SNS-2a and SNS-2b), SNS-3 (SNS-3a and SNS-3b), and SNS-4 (SNS-4a and SNS-4b), respectively. When accumulation is started, voltages of the monitor signals VP1, VP2, VP3, and VP4 are increased, so that accumulation control of the respective sensor arrays is performed.

Signals $\phi$RES and $\phi$VRS serve as reset signals for the sensor. Signals $\phi$HRS and $\phi$SH serve as image signal read clocks. Signals $\phi$T1, $\phi$T2, $\phi$T3, and $\phi$T4, are clocks for terminating accumulation of the respective sensor array pairs.

An output VIDEO from the sensor driver SDR is an image signal obtained by calculating a difference between an image signal VOUT from the sensor SNS and a dark current output and by amplifying the difference with a gain determined by the brightness of the object. The dark current output represents an output value of pixels shielded in the sensor array. The driver SDR causes a capacitor to store an output by a signal DSH from the microcomputer PRS and amplifies a difference between the output and the image signal. The output VIDEO is input to the analog input terminal of the microcomputer PRS. The microcomputer PRS converts this analog signal into digital signal and sequentially stores the digital signals at predetermined addresses of the RAM.

Signals /TINTE1, /TINTE2, /TINTE3, and /TINTE4 represent that charges accumulated in the sensor array pairs SNS-1 (SNS-1a and SNS-1b), SNS-2 (SNS-2a and SNS-2b), SNS-3 (SNS-3a and SNS-3b), and SNS-4 (SNS-4a and SNS-4b) are optimal and accumulation is completed. Upon reception of these signals, the microcomputer PRS performs read access of the image signal.

A signal BTIME is a signal for defining a gain determination timing of the image signal gain amplifier. When the signal BTIME is set at H level, the driver SDR determines a read gain of the corresponding sensor array pair from the monitor signals VP1 to VP4.

Reference clocks CK1 and CK2 are supplied from the microcomputer PRS to the sensor driver SDR to generate the clocks φRES, φVRS, φHRS, and φSH.

The microcomputer PRS sets the communication selection signal CSDR at H level and sends a "accumulation start command" to the sensor driver SDR to start accumulation of the sensor SNS.

Object images formed on the sensors of the four sensor array pairs are photoelectrically converted, so that charges are stored in the photoelectric conversion element unit. At the same time, voltages of the signals VP1 to VP4 for the brightness monitor sensor of the sensors are increased. When the voltages reach predetermined levels, the sensor driver SDR independently sets the signals /TINTE1 to /TINTE4 at L level.

Upon reception of these signals, the microcomputer PRS outputs a predetermined waveform to the clock CK2. The sensor driver SDR supplies the clocks φSH and φHRS to the sensor SNS on the basis of the clock CK2, and the sensor SNS outputs image signals in response to the above clocks. The microcomputer PRS converts the output VIDEO input to its analog input terminal in accordance with its A/D conversion function in synchronism with the clock CK2 output thereby. The digital signals are then sequentially stored at predetermined addresses of the RAM.

Since the operations of the sensor driver SDR and the sensor SNS are disclosed as a focus detection apparatus having two pairs of sensor arrays by the assignee of the present invention in U.S. application Ser. No. 07/764,097, a detailed description thereof will be omitted.

An auxiliary light unit AUXL illuminates an object in a focus undetectable state. When an output terminal CAUXL of the microcomputer PRS is set at H level, a transistor ATR is turned on through a resistor, and a light-emitting diode ALED is turned on. Light from the light-emitting diode ALED is used to illuminate the object by the behavior of an auxiliary light lens ALNS.

An illumination state will be described with reference to FIGS. 4A and 4B.

Figure 4A:
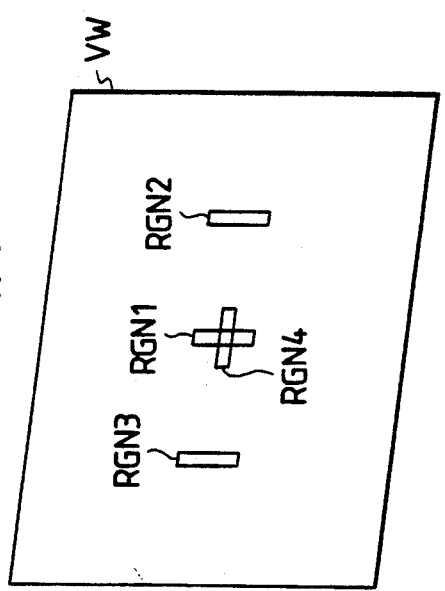
FIGS. 4A and 4B are views for explaining an illumination pattern of auxiliary light in the embodiment shown in FIG. 1.

FIG. 4A is a view showing a state before illumination. A frame VW corresponds to a photographic field. An area 1 (RGN1), an area 2 (RGN2), an area 3 (RGN3), and an area 4 (RGN4) represent object areas (within the frame) which correspond to light beams incident on the sensor arrays SNS-1, SNS-2, SNS-3, and SNS-4, respectively. More specifically, a light beam from the object area RGN1 is incident on the sensors SNS-1a and SNS-1b through a photographic lens and a focus detection optical system.

Figure 4B:
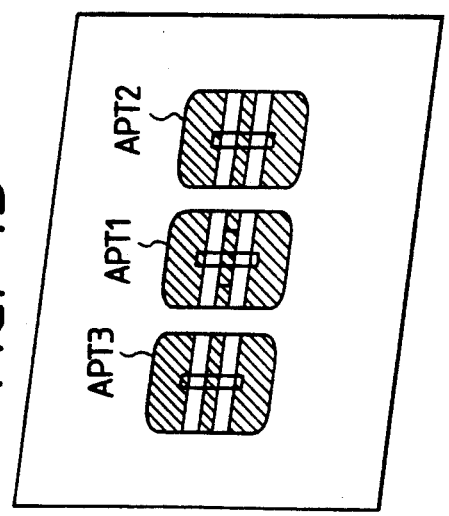

When auxiliary light is projected in a focus undetectable state, the object is illuminated with patterns shown in FIG. 4B. Each pattern is generated by a mask (not shown) located between the light-emitting diode ALED and the lens ALNS. A pattern APT1 is projected to cover the object areas RGN1 and RGN4, a pattern APT2 is projected to cover the area RGN2, and a pattern APT3 is projected to cover the area RGN3.

Each pattern has an identical brightness change in a vertical direction because the areas 1, 2, and 3 are subjected to focus detection on the basis of changes in brightness in the vertical direction. Even if object patterns are vague in the areas 1, 2, and 3, focus detection can be performed with the illumination patterns. In such a pattern, the area RGN4 is not rendered focus detectable with auxiliary light unless a change in brightness of the object in the horizontal direction is present.

As described above, the microcomputer PRS receives image information of the object image formed on each sensor pair and performs a predetermined focus detection calculation, thereby detecting a defocus amount of the photographic lens.

Figure 6A:
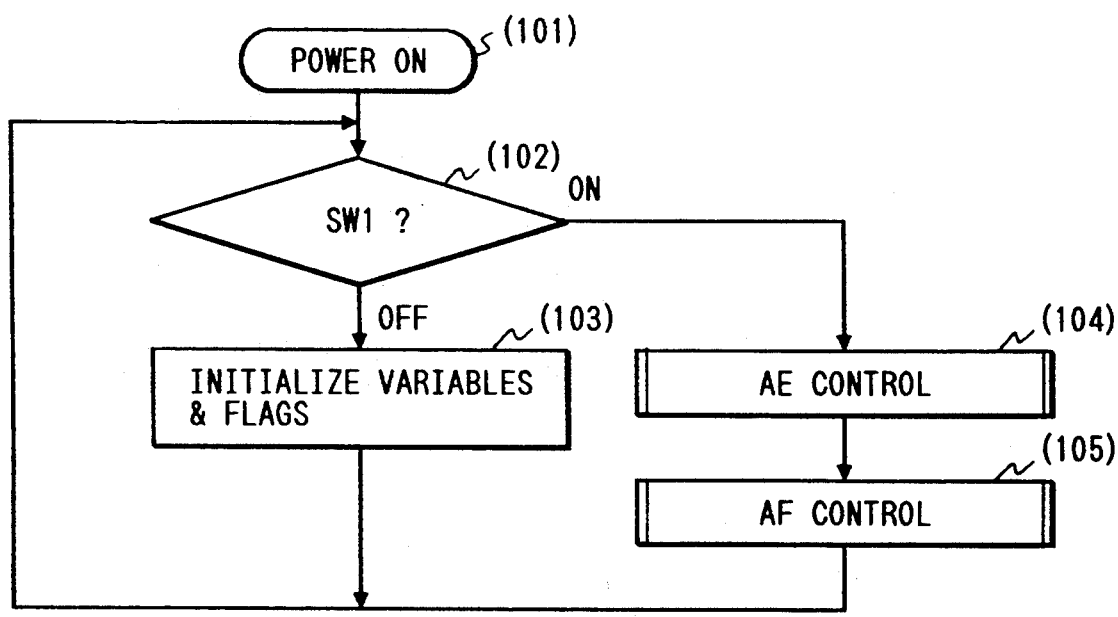
FIGS. 6A and 6B are flow charts for explaining the embodiment of the present invention.

FIG. 6A is a flow chart showing an overall sequence of the camera.

When a power is supplied to the circuit shown in FIG. 2, the microcomputer PRS starts the operation in step (101) of FIG. 6A. In step (102), an operating state of the switch SW1 turned on upon depression of the release switch to the first step is detected. If the OFF state of the switch SW1 is detected, the flow advances to step (103), and variables and flags are initialized. However, when the ON state of the switch SW1 is detected, the flow advances to step (104) and the operation of the camera is started.

In step (104), an "AE control" subroutine such as a photometric operation and detection of states of various switches and displays is executed. Since the AE control is not directly associated with the present invention, a detailed description thereof will be omitted. When the subroutine "AE control" is completed, the flow advances to step (105).

An "AF control" subroutine is executed in step (105). Accumulation and focus detection operations and automatic focus control operations for driving the lens are performed. When the subroutine "AF control" is completed, the flow returns to step (102), and the operations in steps (104) and (105) are repeated until the apparatus is turned off.

Although the flow chart of this embodiment does not describe the release operation, the release operation is not directly associated with the present invention, and a detailed description thereof will be omitted.

Figure 1C:
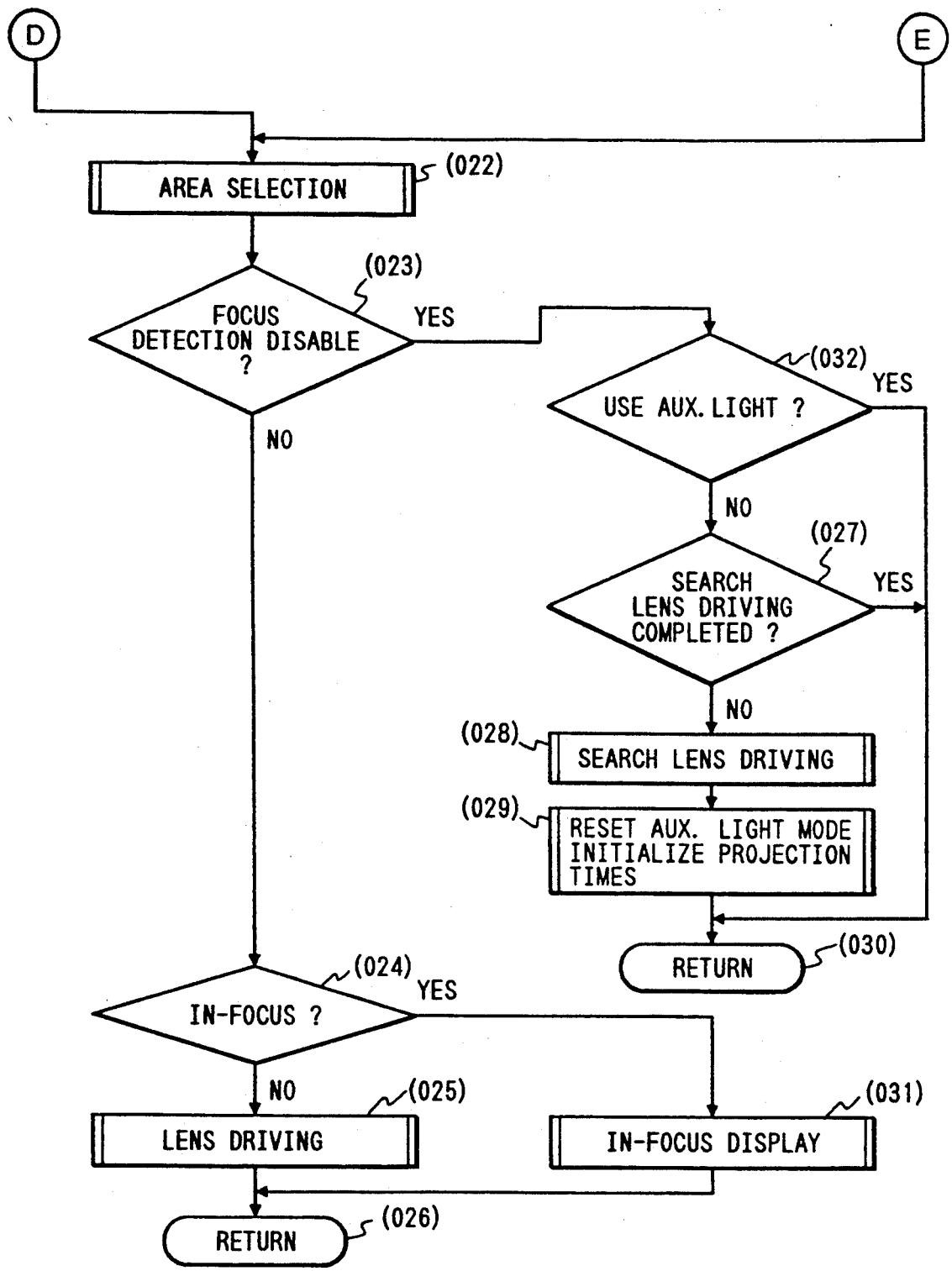
FIG. 1 is a flow chart for explaining a main operation of a focus detection apparatus according to an embodiment of the present invention.

FIG. 1 is a flow chart of the subroutine "AF control" executed in step (105).

When the subroutine "AF control" is called, AF control from step (002) is executed through step (001).

It is determined in step (002) whether a mode for projecting auxiliary light to perform focus detection (i.e., an auxiliary light mode hereinafter) is currently set. If YES in step (002), the flow advances to step (003).

A light projection count of the auxiliary light is checked in step (003). If the auxiliary light is projected two times to the present, the flow advances to step (005). That is, in this embodiment, the auxiliary light is set to be projected a maximum of two times.

If the light projection count is less than 2 in step (003), the auxiliary light turned ON in step (004), and the flow advances to step (005). An auxiliary light ON operation is performed by setting the output terminal CAUXL of the microcomputer PRS to H level, as previously described. An "accumulation start" subroutine is executed in step (005). This subroutine is a routine for starting an accumulation operation of the sensor.

An "image signal input & focus detection calculation" subroutine is executed in step (006). This subroutine is a subroutine for monitoring accumulation states of the four sensors of this embodiment, sequentially receiving image signals from the sensors whose accumulation is completed, and detecting a defocus amount of an object area of each sensor.

The detailed calculations of the "accumulation start" and "image signal input & focus detection calculation" subroutines are disclosed in U.S. application Ser. No. 07/764,097, and in U.S. application Ser. No. 07/610,575 filed by the assignee of the present invention, and a detailed description thereof will be omitted.

In the above processing, the defocus amounts of the respective four object areas are obtained. Focus detectable and undetectable states are also determined by a known method in accordance with contrast levels of the image signals.

When the subroutine in step (006) is completed, the flow advances to step (007).

It is determined in step (007) whether the auxiliary light is ON. If YES in step (007), the flow advances to step (021). Otherwise, the flow advances to step (008).

A state in which the auxiliary light is OFF will be described first.

In step (008), an area selection mode is determined. The area selection modes are classified into a mode (to be referred to as an auto mode hereinafter) for automatically selecting one of the four object modes, and a mode (an arbitrary mode hereinafter) for causing a photographer to select an arbitrary area. Either mode is set when the microcomputer PRS shown in FIG. 2 detects states of switches SWS through a switch detector DDR. More specifically, when a specific one of the switches SWS is ON, the auto mode is set. However, if the specific switch is OFF, the arbitrary mode is set.

In the arbitrary mode, as in the mode setting method, the photographer arbitrarily determines a specific one of the object areas in accordance with the ON/OFF state of the specific one of the switches SWS in advance. The switching state is detected through the switch detector DDR to select the specific area.

When the microcomputer PRS determines in step (008) that the object area selection mode is the auto mode, the flow advances to step (009).

The microcomputer PRS determines in step (009) whether both the areas 1 and 4 are set in the focus disable state. If YES in step (009), the flow advances to step (010). The areas 1 and 4 correspond to the object areas RGN1 and RGN4 in FIG. 4A, respectively, and are defined as the central areas of the frame. Therefore, the flow advances to step (010) because the central object areas of the frame are focus undetectable.

An auxiliary light projection count is checked in step (010). If the count is 2, the flow advances to step (022). Otherwise, the flow advances to step (011) to check an accumulation time of the sensor SNS-1 for the object area 1. If the accumulation time is 10 ms or less, the flow advances to step (022).

If, however, the accumulation time exceeds 10 ms, the flow advances to step (012) to determine whether the accumulation time of the sensor SNS-1 for the area 1 exceeds 100 ms. If YES in step (012), the flow advances to step (014) to set the auxiliary light mode, and then the "AF control" subroutine is ended in step (015). When the accumulation time of the sensor SNS-1 falls within the range of 10 ms to 100 ms, the flow advances to step (013) to check a minimum value of the image signal of the object area 1 (i.e., the minimum value of the pixel outputs respectively accumulated in the pixels of the sensor for the area 1). That is, it is determined whether the minimum value is smaller than a predetermined threshold value Bth. If YES in step (013), the flow advances to step (022). Otherwise, the flow advances to step (014) in the same manner as in the case wherein the accumulation time exceeds 100 ms, thereby setting the auxiliary light mode.

When the object area selection mode is the arbitrary mode, the flow advances from step (008) to step (016).

The microcomputer PRS determines in step (016) whether the preset selection area of the object is detectable. If NO in step (016), the flow advances to step (017).

The contents of steps (017) to (020) to be executed are the same as those of steps (010) to (013) executed in the auto mode, except that the object area 1 is subjected to processing in the auto mode, while the selected area is subjected to processing in the arbitrary mode.

The operations in steps (008) to (020) are summarized as follows. When the area selection mode is the auto mode, the area 1 as the central object area of the frame is regarded as the selected area in the arbitrary mode. It is then determined whether the auxiliary light is used in accordance with a focus detection result of this area, an accumulation time, and a state of an image signal.

Determination meanings of steps (013) and (020) will be described with reference to FIGS. 5A and 5B.

Figure 5A:
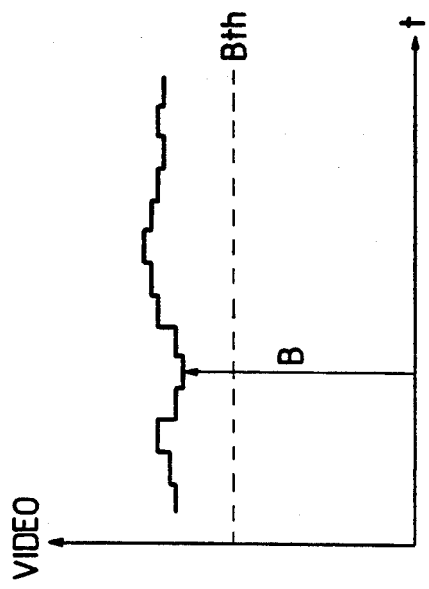
FIGS. 5A and 5B are views for explaining an effect of the present invention.

FIG. 5A shows an image signal obtained upon focus detection of an object having a small change in brightness. A minimum value B of this image signal exceeds the predetermined threshold value Bth.

Figure 5B:
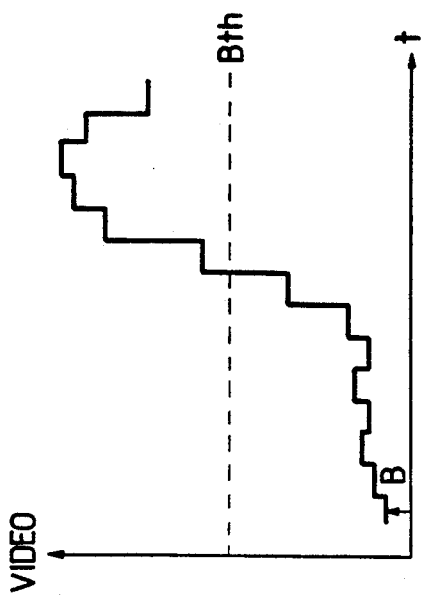

FIG. 5B shows an image signal obtained upon focus detection of an object having a black-and-white edge shape in a large defocus state. In this case, a minimum value B of this image signal is considerably smaller than the predetermined threshold value Bth. In this case, although the image signal has a considerable change in brightness, a focus detection result represents an undetectable state due to a large defocus state. Therefore, when the threshold value Bth is set, as shown in FIG. 5B, and the minimum value B is smaller than the threshold value Bth, the auxiliary light is not used to prevent wasteful auxiliary light projection.

Referring back to FIG. 1, in this embodiment, when the accumulation time of the object area of interest is 10 ms or less, auxiliary light is not used even if a focus undetectable state is determined. When the accumulation time falls within the range between 10 ms to 100 ms, auxiliary light is used only when the minimum value of the image signal is larger than the predetermined value. When the accumulation time exceeds 100 ms, the auxiliary light is always projected.

When use of the auxiliary light is determined in step (014), no previous detection result is used at all, and the "AF control" subroutine is ended in step (015). When the next "AF control" subroutine is called, auxiliary light is projected from the beginning to perform focus detection.

When an auxiliary light ON state is determined in step (007), the auxiliary light is turned off in step (021) without executing steps (008) to (020), and then the flow advances to step (022).

In focus detection with the use of auxiliary light, the mode is set in the auxiliary light mode. Therefore, processing for determining whether auxiliary light is used in steps (008) to (020) need not be performed. That is, it does not make any sense to determine the accumulation time in use of auxiliary light.

The "area selection" subroutine for selecting an object area is executed in step (022).

Figure 6B:
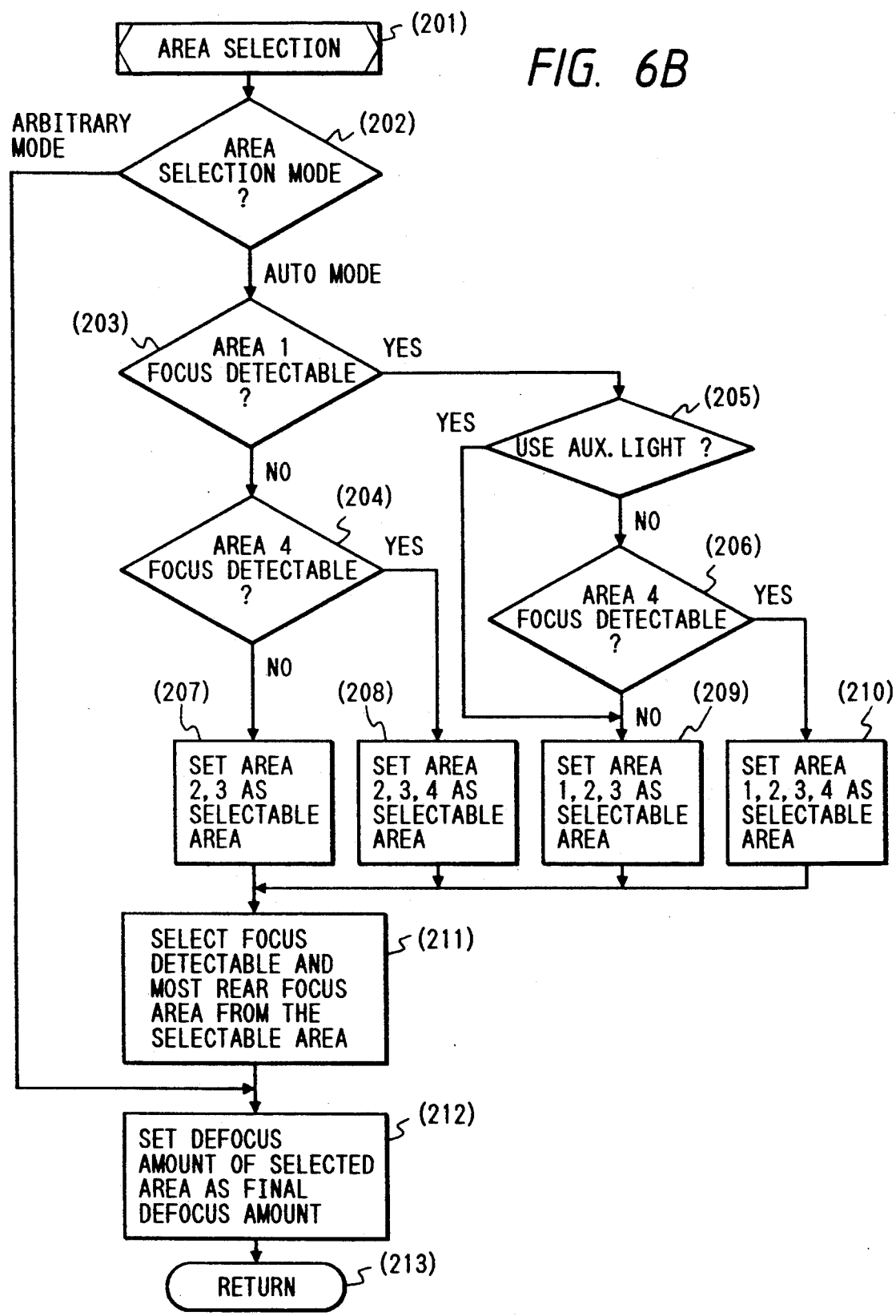

A flow chart of this subroutine is shown in FIG. 6B.

When this subroutine is called, processing from step (202) is executed through step (201).

If the arbitrary mode is determined to be set in step (202), the flow advances to step (212). A defocus amount of the pre-selected area is defined as a final defocus amount, and the "area selection" subroutine is ended in step (213).

When the mode, however, is set in the auto mode, the flow advances to step (203) to determine whether the object area 1 is detectable. If YES in step (203), the flow advances to step (205).

It is determined in step (205) whether focus detection is performed using auxiliary light. If YES in step (205), the flow advances to step (209) to select the object areas 1, 2, and 3 as selection area candidates or selectable areas. That is, the areas 1, 2, and 3 correspond to the areas RGN1, RGN2, and RGN3 (FIG. 4A), respectively. The auxiliary light radiation patterns described above cause changes in brightness in the vertical direction so as to be suitable for the areas RNG1, RNG2, and RNG3. For this reason, if the area 1 as one of the central areas of the frame is detectable, one of the areas 1, 2, and 3 is selected regardless of the detection result for the area 4. An improvement in the focus detection result cannot be much expected for the object area 4 even with use of auxiliary light. If the area 4 is detectable and is selected as a selection area candidate, a detection result of an illumination pattern which is not suitable for the area 4 may be employed. In this case, a defocus amount including a large detection error is undesirably defined as a final defocus amount. When this is taken into consideration, in this embodiment, the area 1 has a priority over the area 4 in the presence of auxiliary light although these areas 1 and 4 are similarly defined as central object areas of the frame.

In focus detection in the absence of auxiliary light, the area 1 does not have any priority over the area 4, and the microcomputer PRS determines in step (206) whether the object area 4 is focus detectable.

If YES in step (206), the flow advances to step (210), and all object areas are set as selectable areas.

If the area 4 is determined in step (206) not to be focus detectable, the flow advances to step (209) to set the areas 1, 2, and 3 as selectable areas, as a matter of course.

If the object area 1 is not focus detectable in step (203), the flow advances to step (204) and a detection result of the area 4 is performed as in step (206). The flow advances to steps (207) and (208) in accordance with the determination result of step (206), thereby setting corresponding selectable areas.

When the selectable areas are set in steps (207) to (210), the flow advances to step (211) to select a focus detectable and most rear focus area from the selectable areas. The most rear focus area indicates that the object observed through this area is located nearest to the camera. Therefore, in this embodiment, the nearest object to the camera is selected from a plurality of objects.

When selection in step (211) is completed, the flow advances to step (212), and the defocus amount of the selected area is defined as a final defocus amount. The "area selection" subroutine is ended in step (213).

When this subroutine is completed, the flow returns to step (023) in FIG. 1.

The microcomputer PRS determines in step (023) whether the final focus detection result is disabled. If YES in step (023), the flow advances to step (032).

It is determined in step (032) whether the present focus detection is performed in the presence of auxiliary light. If YES in step (032), the flow is branched into step (030), and the "AF control" subroutine is ended. However, if NO in step (032), the flow advances to step (027). Processing from step (027) is associated with search lens driving (to be described later). This branch determination step as step (032) is provided not to perform search lens driving with use of the auxiliary light.

The microcomputer PRS determines in step (027) whether search lens driving has been already performed once. If YES in step (027), the flow advances to step (030), and the "AF control" subroutine is ended. However, if NO in step (027), the flow advances to step (028), and the "search lens driving" subroutine is executed.

This subroutine is an operation for repeatedly performing focus detection while the lens is driven to the nearest or infinite side in a focus undetectable state. A detailed operation is disclosed in U.S. Pat. No. 4,812,869 and a detailed description thereof will be omitted herein.

When the "search lens driving" subroutine is completed, the flow advances to step (029) to cancel the auxiliary light mode and initialize the auxiliary light projection count to provide one more opportunity for performing focus detection with use of auxiliary light at the end of search lens driving. That is, when the focus detection disable state occurs, it is determined whether auxiliary light is used or not. If it is used, it is projected a maximum of two times to perform focus detection. If the focus detection is still disabled, search lens driving is performed. The distance ring positions of the photographic lens are generally different from each other when the auxiliary light is projected for the first time and when search lens driving is completed. When auxiliary light is used again at the distance ring position (generally infinite position) upon completion of search lens driving, focus detection can be performed. This is why the above operation is performed.

When step (029) is completed, the flow advances to step (030) and the "AF control" subroutine is ended.

When it is determined in step (023) that focus detection is possible, the flow advances to step (024) to determine whether the final defocus amount falls within the in-focus range. If YES in step (024), the flow advances to step (031) to execute the "in-focus display" subroutine, thereby performing an in-focus display within the finder. If NO in step (024), the flow advances to step (025) to perform the "lens driving" subroutine, and the photographic lens is driven on the basis of the defocus amount. This subroutine is disclosed in U.S. Pat. No. 4,812,869 filed by the assignee of the present invention, and a detailed description thereof will be omitted.

When the "lens driving" subroutine in step (025) or the "in-focus display" subroutine (031) is completed, the flow advances to step (026) to end the "AF control" subroutine.

Upon completion of this subroutine, as shown in the flow chart of FIG. 6A, the "AE control" and "AF control" subroutines are alternately executed as long as the switch SW7 is kept ON.

The operations in the above flows will be summarized as follows.

When a focus detectable state is determined, the flow advances to step (022) through step (002), (005), (006), (007), (008), and (009), or (016). In the arbitrary mode, the defocus amount of the selected area is selected in step (022). In the auto mode, a defocus amount of the most rear focus area is selected from the areas in step (022). If an in-focus state is detected in steps (024), (025), and (031), an in-focus display is performed. Otherwise, the lens is driven by the defocus amount to perform a focus operation.

During the above operations, when both the areas 1 and 4 sensors are determined to be undetectable or when the selected area sensor is determined to be undetectable in step (009) or (016), the operations in steps (019) to (014) or (017) to (020) are performed. In the auto mode, the accumulation time of the area 1 sensor is a long time (exceeding 100 ms) or the accumulation time is optimal (10 ms to 100 ms) but the minimum value of the image signal exceeds a predetermined level, the auxiliary light mode is set. Therefore, auxiliary light projection is inhibited in a large defocus state. On the other hand, the output from the sensor for the selected area is determined in the arbitrary mode in the same condition as in the auto mode to determine whether auxiliary light is projected.

When the auxiliary light mode is set, the flow returns to step (002) again, and the operations in steps (003), (004), (005), (007), and (021) are performed to perform focus detection in the presence of auxiliary light. Thereafter, in step (022), in the arbitrary mode, a defocus amount of the selected area is obtained. In the auto mode, a defocus amount of the automatically selected area is obtained. When the output from the sensor for the selected area represents a focus undetectable state in step (023), focusing based on the defocus amount is performed.

On the other hand, when a focus undetectable state is determined although auxiliary light is projected; the present focus detection is performed in the presence of auxiliary light in step (032), and this flow is ended.

When the focus detection operation in the presence of auxiliary light is performed again, and a focus undetectable state is determined again, the flow is ended, so that a focus detection operation is performed again. In this case, since the auxiliary light has already been projected two times, focus detection in the absence of auxiliary light is performed, i.e., the operation in step (004) is not performed, and the flow advances to steps (022) and (023) through steps (008) and (009); (008), (009), and (010); (008) and (016); or (008), (016), and (017). In this case, if a focus undetectable state is determined, the flow advances to steps (027) and (028) through step (032) to perform search lens driving. In the search lens driving routine, a focus detection operation is performed while the lens is being driven. When a focus undetectable state is determined, the flow returns from this subroutine to the AF control subroutine of step (001), and the above-mentioned focus detection operation is restarted. When a focus detectable state is not obtained even if the lens is driven in the entire range (i.e., nearest position to the infinite position) by the search lens driving, the lens is held at a predetermined position (nearest position or infinite position), and the flow advances to step (029). In this step, the auxiliary light mode is canceled, the light projection count is initialized, and the routine is ended. In this manner, when the focus detection operation is restarted upon completion of the search operation, focus detection is performed in the absence of auxiliary light. When an optimal defocus amount is detected, focusing is performed on the basis of the detected defocus amount. On the other hand, when a focus undetectable state occurs even in focus detection without use of auxiliary light, focus detection is performed in the presence of auxiliary light, as described above. If a focus undetectable state is still present, auxiliary light is projected to perform focus detection again. In this manner, the auxiliary light is projected two times upon completion of the search operation, thereby performing focus detection. If a focus undetectable state is still present, focus detection in the absence of auxiliary light is then performed.

In the above embodiment described, there are two object areas at the center of the frame. The present invention is more effective when the number of central object areas is one, as a matter of course.

In the above embodiment, the number of object areas to be excluded from area selection is one. However, a plurality of areas can be excluded, depending on an arrangement of a focus detection system, to obtain the same effect as in the present invention.

If a plurality of auxiliary light beams are used and have different illumination patterns, they should not be simultaneously projected. Object areas which are not compatible with given illumination patterns are eliminated in each auxiliary light illumination operation.

What is claimed is:

1. A focus detection apparatus for detecting focus states in a plurality of different areas in a scene based on outputs from a plurality of sensor circuits each of which independently receives light from a different area of the scene, said apparatus comprising:

a determination circuit for determining whether a focus undetectable state occurs in a specific one of the different areas on the basis of an output from a sensor circuit corresponding to the specific area; and an auxiliary light control circuit for generating a signal for driving an auxiliary light source when the focus undetectable state is determined by said determination circuit.

2. An apparatus according to claim 1, wherein said sensor circuits are arranged in at least right, central, and left portions of the scene, and the specific area comprises the central area.

3. An apparatus according to claim 2, wherein said sensor circuit of said central area has first and second sensor portions whose arrangement directions are different from each other, and said auxiliary light control circuit is operated when said determination circuit determines that outputs from said first and second sensor portions both represent focus undetectable states.

4. An apparatus according to claim 1, further comprising a selection circuit for automatically selecting a focus state of one of said areas corresponding to an output of each said sensor circuit.

5. A camera having a focus detection apparatus for detecting focus states in a plurality of different areas in a scene based on outputs from a plurality of sensor circuits each of which independently receives light from a different area of the scene, said camera comprising:

a determination circuit for determining whether a focus undetectable state occurs in a specific one of the different areas on the basis of an output from said sensor circuit corresponding to the specific area; and an auxiliary light control circuit for driving an auxiliary light source when the focus undetectable state is determined by said determination circuit.

6. A camera according to claim 5, wherein said sensor circuits are arranged in at least left, right, and central portions of the scene, and wherein the specific area is the central area.

7. A camera according to claim 6, wherein said sensor circuit of said central area has first and second sensor portions whose arrangement directions are different from each other, and said auxiliary light control circuit is operated when said determination circuit determines that outputs from said first and second sensor portions both represent focus undetectable states.

8. A camera according to claim 5, further comprising a selection circuit for automatically selecting a focus state of one of said areas corresponding to an output of each said sensor circuit.

9. A camera provided with a focus detection apparatus having a plurality of sensor circuits each of which independently receives a light from a different area in a scene, and a selection circuit for selecting an arbitrary areas within the different areas by manual operation, wherein a focus state of the selected area is detected on the basis of an output of the sensor circuit which detects the light from the selected area, said camera comprising:
   a discrimination circuit for discriminating whether the focus detection operation can be performed on the basis of the output of said sensor circuit which detects the light from said selected area; and
   an auxiliary light control circuit for generating a signal for driving an auxiliary light source when said discrimination circuit determines that the focus detection operation cannot be performed for the selected area.

10. A camera according to claim 9, wherein the selection circuit selects a focus state representing a most rear focus state of the focus states.

11. A focus detection apparatus for detecting focus states in a plurality of different areas in a scene based on outputs from a plurality of sensor circuits each of which independently receives light from a different area of the scene, said apparatus comprising a prohibition circuit for prohibiting, when an auxiliary light is being projected, the focus detection operation of a specific one of the different areas based on an output from a specific sensor circuit which is receiving light from the specific area within the different areas to which said auxiliary light is projected, wherein said focus detection apparatus detects focus states of a plurality of different areas including said specific area when said auxiliary light is not being projected.

12. An apparatus according to claim 11, wherein the specific area is an area in which a sensor circuit unsuitable for detecting auxiliary light characteristics is arranged.

13. A focus detection apparatus having a plurality of sensor circuits each of which independently detects light from different areas in a scene, and a selection circuit for selecting a focusing state of a certain area among the focusing states of said different areas which are determined based on the outputs of said sensor circuits, said apparatus comprising a prohibition circuit for prohibiting, when an auxiliary light is being projected, the selection of a specific area among said plurality of areas, wherein said selection circuit selects a certain area among a plurality of areas including said specific area when the auxiliary light is not being projected.

14. An apparatus according to claim 13, wherein the specific area is an area in which a sensor circuit unsuitable for detecting light characteristics is arranged.

15. An apparatus according to claim 13, wherein the auxiliary light is pattern-projected, and the specific area comprises an area in which a sensor circuit which is unsuitable for detecting the pattern of the auxiliary light is arranged.

16. A focus detection apparatus having sensor circuits for respectively receiving light beams from a plurality of areas and for respectively detecting focus states of the areas, comprising:
   a selector having a manual mode for selecting one of the areas by a manual operation and an automatic mode for automatically selecting a specific area of the areas; and
   an inhibition circuit for inhibiting selection of a specific area by said selector, said inhibition circuit being operative in the automatic mode upon projection of auxiliary light and being inoperative in the manual mode.

17. A focus detection apparatus for operating an auxiliary light source in a focus undetectable state to perform a focus detection operation, comprising:
   (a) a signal accumulation type sensor array having a plurality of pixels;
   (b) a determination circuit for determining whether a minimum level of signal levels accumulated in the plurality of pixels of said sensor arrays is smaller than a predetermined value; and
   (c) an inhibition circuit for inhibiting an operation of said auxiliary light source when said determination circuit determines the minimum level is smaller than the predetermined value.

18. An apparatus according to claim 17, further comprising an accumulation time control circuit for controlling a signal accumulation time of said sensor array until a signal level from said sensor array becomes the predetermined value, and wherein said determination circuit is operated after accumulation time control is performed by said accumulation time control circuit.

19. A focus detection apparatus having a plurality of sensor circuits each of which independently receives light from a different area in a scene, and a selection circuit for selecting an arbitrary area within the different areas by manual operation, wherein a focus state of the selected area is detected on the basis of an output of the sensor circuit which detects the light from the selected area, said apparatus comprising:
   a discrimination circuit for discrimination whether the focus detection operation can be performed on the basis of the output of said sensor circuit which detects the light from said selected area; and
   an auxiliary light control circuit for generating a signal for driving an auxiliary light source when said discrimination circuit determines that the focus detection operation cannot be performed for the selected area.

20. A focus detection apparatus having first and second sensor portions for respectively performing focus detection upon receipt of different lights, wherein said second sensor portion performs the focus detection upon receipt of a second light and said first sensor portion performs the focus detection upon receipt of a first light different from said second light, said apparatus comprising:
   an inhibition circuit for inhibiting focus detection on the basis of an output from said first sensor portion when the auxiliary light source projects said second light on an object, wherein, by projecting the auxiliary light, said first and second sensor portions both receive said second light.

21. A focus detection apparatus having a first mode in which a focus detection to an object is performed using a light flux having a predetermined pattern which is projected from an auxiliary light source and reflected from the object, and a second mode in which the focus detection is performed without projecting the light flux from said auxiliary light source, said apparatus comprising:

a sensor circuit comprising a plurality of sensor portions including at least first and second sensor portions; and a processing circuit for, in said second mode, performing the focus detection on the basis of an output of one of said sensor portions among outputs of the sensor portions including said first and second sensor portions, and for, in said first mode, prohibiting the focus detection on the basis of the output of said first sensor portion, wherein at least said first and second sensor portions receive auxiliary light reflected from the object in said first mode, and wherein said first and second sensor portions extend in different direction from one another.

22. A focus detection apparatus according to claim 21, wherein said first and second sensor portions extend orthogonal to each other.

23. An apparatus according to claim 11, further comprising a selection circuit for automatically selecting a focus state of one of said areas corresponding to an output of one of said sensor circuits.

24. An apparatus according to claim 13, wherein the selection circuit automatically selects the focusing state of one specific area among the plurality of focusing states.

25. An apparatus according to claim 18, further comprising a control circuit for suppressing the operation of said inhibition circuit when the accumulation time controlled by said accumulation circuit exceeds a predetermined time period.

* * * * *

UNITED STATES PATENT AND TRADEMARK OFFICE
CERTIFICATE OF CORRECTION

PATENT NO. : 5,293,194

DATED : March 8, 1994

INVENTOR(S) : AKASHI

It is certified that error appears in the above-indentified patent and that said Letters Patent is hereby corrected as shown below:

On the title page, item

[56] U.S. Patent Documents

Change "4,071,626  10/1987  Ishizaki et al." to --4,701,626  10/1987  Ishizaki et al.--.

Column 3

Line 27, change "comprises of:" to --comprises--.

Column 7

Line 5, change "a" to --an--.
Line 31, change "07/764,097," to --07/765,097,--.

Column 14

Line 6, change "above embodiment described," to --above-embodiment described,--.

Column 15

Line 16, "areas within" should read --area within--.

UNITED STATES PATENT AND TRADEMARK OFFICE
CERTIFICATE OF CORRECTION

PATENT NO. : 5,293,194
DATED : March 8, 1994
INVENTOR(S) : AKASHI

It is certified that error appears in the above-indentified patent and that said Letters Patent is hereby corrected as shown below:

<u>Column 16</u>

Line 9, change "a specific area" to --one--.
    Line 23, change "arrays" to --array--.
    Line 44, change "discrimination" (second occurrence) to --discriminating--.

Signed and Sealed this

Eighteenth Day of October, 1994

Attest:

BRUCE LEHMAN

Attesting Officer      *Commissioner of Patents and Trademarks*